(12) United States Patent
Kitayama et al.

(10) Patent No.: US 12,081,087 B2
(45) Date of Patent: Sep. 3, 2024

(54) ROTARY ELECTRIC MACHINE

(71) Applicant: TOYOTA JIDOSHA KABUSHIKI KAISHA, Toyota (JP)

(72) Inventors: Takeshi Kitayama, Shizuoka-ken (JP); Hiroyuki Hattori, Okzaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 17/881,837

(22) Filed: Aug. 5, 2022

(65) Prior Publication Data

US 2023/0100109 A1 Mar. 30, 2023

(30) Foreign Application Priority Data

Sep. 27, 2021 (JP) ................. 2021-157055

(51) Int. Cl.
*H02K 1/27* (2022.01)
*H02K 1/276* (2022.01)
*H02K 21/02* (2006.01)

(52) U.S. Cl.
CPC ............ *H02K 21/028* (2013.01); *H02K 1/27* (2013.01); *H02K 1/2766* (2013.01)

(58) Field of Classification Search
CPC .... H02K 21/16; H02K 1/2766; H02K 21/028; H02K 1/27; H02K 1/2706; H02K 1/274; H02K 1/276; H02K 21/14; H02K 2213/09; H02K 1/22
USPC ....................................... 310/156.17, 156.16
See application file for complete search history.

(56) References Cited

U.S. PATENT DOCUMENTS

2019/0165659 A1* 5/2019 Hattori .................. H02K 1/276

FOREIGN PATENT DOCUMENTS

JP     2002136012 A  *  5/2002
JP     2007-267453 A    10/2007

OTHER PUBLICATIONS

Hachisuga Kimio, Rotating Electric Machine of Permanent Magnet Type, May 10, 2002, JP 2002136012 (English Machine Translation) (Year: 2002).*

* cited by examiner

*Primary Examiner* — Alexander A Singh
(74) *Attorney, Agent, or Firm* — Sughrue Mion, PLLC

(57) ABSTRACT

A rotary electric machine includes: a shaft that rotates about an axial direction; a rotor that is disposed around the shaft and that includes a rotor core and a plurality of magnets provided in the rotor core; a stator that is disposed around the rotor and that includes a stator core and a stator coil provided in the stator core; a magnetic flux short circuit plate that is disposed so as to face the rotor core in the axial direction and that moves in the axial direction; a biasing member that biases the magnetic flux short circuit plate to a side away from the rotor core; a holding member that holds the biasing member; and a fixing member that fixes the holding member to the shaft. Further, a strength of a material of the fixing member is higher than a strength of a material of the holding member.

3 Claims, 2 Drawing Sheets

ROTARY ELECTRIC MACHINE

CROSS-REFERENCE TO RELATED APPLICATION(S)

The present application claims priority to and incorporates by reference the entire contents of Japanese Patent Application No. 2021-157055 filed in Japan on Sep. 27, 2021.

BACKGROUND

The present disclosure relates to a rotary electric machine.

Japanese Laid-open Patent Publication No. 2007-267453 discloses an electric motor including a magnetic flux short circuit plate that abuts on a plurality of permanent magnets and short-circuits a magnetic flux when moved to one side in an axial direction of a rotation shaft and that separates from the permanent magnets when moved to the other side in the axial direction of the rotation shaft. The rotation shaft rotatably supports a rotor in which the plurality of permanent magnets is disposed in a peripheral direction.

When a magnetic flux generated from a permanent magnet is not short-circuited by a magnetic flux short circuit plate, in possible configuration, a biasing member is provided and held in a housing fixed to a rotation shaft in order to separate the magnetic flux short circuit plate from the permanent magnet. The biasing member includes a spring that biases the magnetic flux short circuit plate in an axial direction of the rotation shaft. In the direction, the magnetic flux short circuit plate separates from the permanent magnet. When a holding portion and a fixing portion of the housing are integrally molded of the same material with high strength in consideration of a heavy load applied to the fixing portion at the time of rotation of the rotation shaft, however, machining costs of machining and the like are increased, and eventually, costs of a rotary electric machine are increased. The holding portion holds a spring. The fixing portion fixes the rotation shaft.

SUMMARY

There is a need for providing a rotary electric machine capable of inhibiting an increase in cost.

According to an embodiment, a rotary electric machine includes: a shaft that rotates about an axial direction; a rotor that is disposed around the shaft and that includes a rotor core and a plurality of magnets provided in the rotor core; a stator that is disposed around the rotor and that includes a stator core and a stator coil provided in the stator core; a magnetic flux short circuit plate that is disposed so as to face the rotor core in the axial direction and that moves in the axial direction; a biasing member that biases the magnetic flux short circuit plate to a side away from the rotor core in the axial direction; a holding member that holds the biasing member; and a fixing member that fixes the holding member to the shaft. Further, a strength of a material of the fixing member is higher than a strength of a material of the holding member.

DETAILED DESCRIPTION

An embodiment of a rotary electric machine according to the present disclosure will be described below. Note that the embodiment does not limit the present disclosure.

Figure 1:
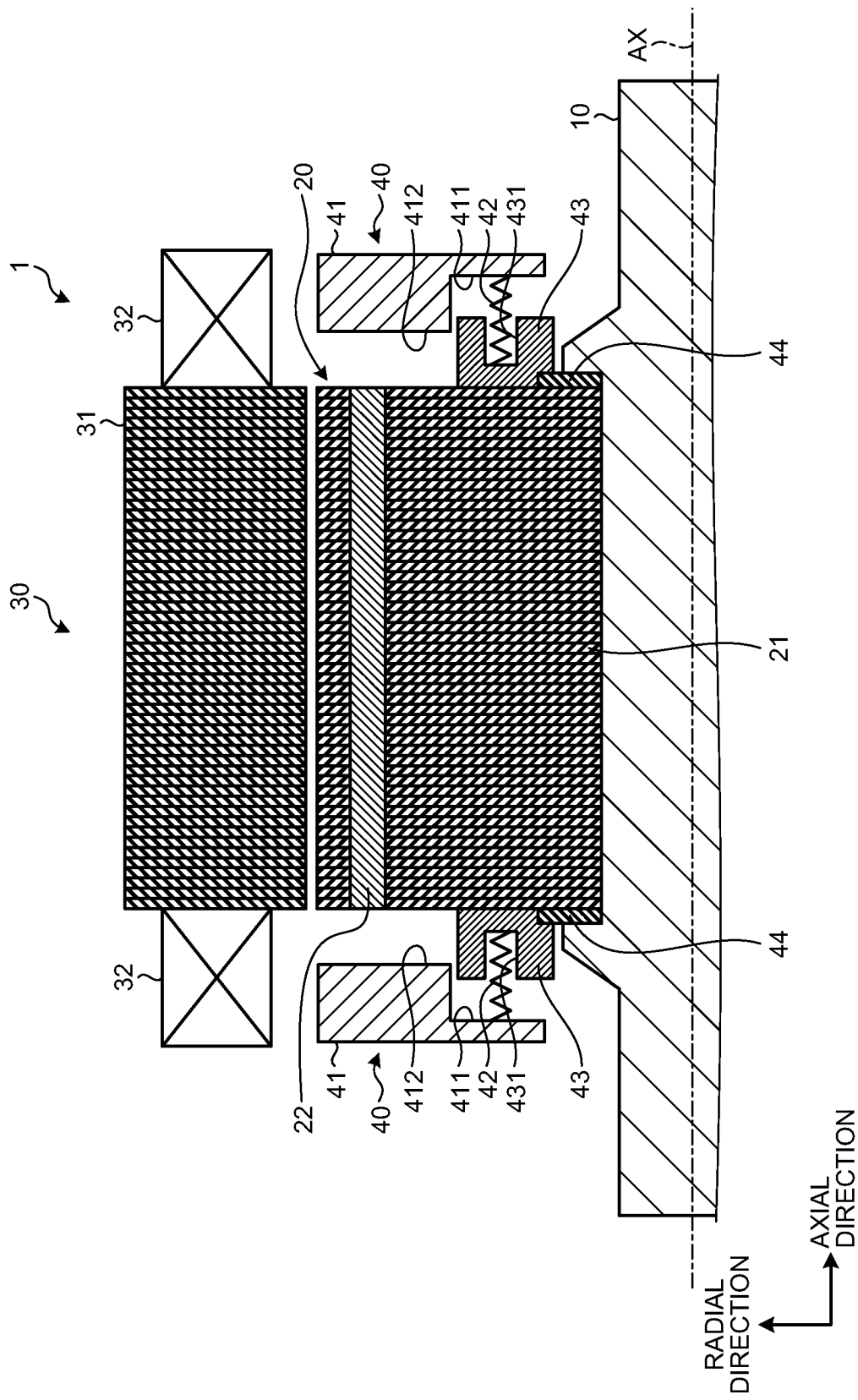
FIG. 1 is a side view illustrating the configuration of a rotary electric machine according to an embodiment, and illustrates a magnetic flux short circuit plate located at a first position.

A rotary electric machine 1 according to the embodiment is, for example, a permanent magnet motor. As illustrated in FIG. 1, the rotary electric machine 1 includes a shaft 10, a rotor 20, a stator 30, and a magnetic flux variable mechanism 40. Note that FIG. 1 illustrates only the upper half from an axis AX of the shaft 10 in side view of the rotary electric machine 1.

The shaft 10 is a shaft member that can rotate about the axial direction. The shaft 10 has an elongated shape. Note that the "axial direction" indicates a direction along the axis AX of the shaft 10.

The rotor 20 is disposed around (radially outside) the shaft 10, and more specifically, fixed to the shaft 10. The rotor 20 includes a rotor core 21 and a plurality of magnets (permanent magnets) 22.

The rotor core 21 is formed by laminating a plurality of electromagnetic steel plates in the axial direction, and has a cylindrical shape as a whole. A magnet 22 is embedded in the rotor core 21, and extends in the axial direction of the rotor core 21. Furthermore, as illustrated in FIG. 1, an end surface of the magnet 22 in the axial direction is flush with an end surface of the rotor core 21 in the axial direction.

The stator 30 is disposed around (radially outside) the rotor 20 with a gap therebetween. Furthermore, the stator 30 includes a stator core 31 and a stator coil 32. The stator core 31 is formed by laminating a plurality of electromagnetic steel plates in the axial direction, and has a cylindrical shape as a whole. The stator coil 32 is wound around a plurality of teeth formed on the inner peripheral side of the stator core 31, for example.

The magnetic flux variable mechanism 40 changes a magnetic flux from the magnet 22 of the rotor 20 toward the stator 30. The magnetic flux variable mechanism 40 includes a magnetic flux short circuit plate 41, a coil spring 42, a spring housing member 43, and a shaft fastening member 44.

The magnetic flux short circuit plate 41 short-circuits the magnetic flux of the magnet 22 of the rotor 20. The magnetic flux short circuit plate 41 includes a magnetic material, and has a disk shape. Furthermore, as illustrated in FIG. 1, the magnetic flux short circuit plate 41 is disposed so as to face the rotor core 21 in the axial direction. The magnetic flux short circuit plate 41 includes an annular portion 411 and a protrusion 412. The annular portion 411 is provided radially on the inner peripheral side. The protrusion 412 is provided radially on the outer peripheral side, and protrudes axially to the side of the rotor core 21 from the annular portion 411. The annular portion 411 has an opening on the inner peripheral side. The shaft 10 is inserted through the opening. Each of a plurality of coil springs 42 is in contact with a surface of the annular portion 411, which axially faces the rotor core 21. A surface of the protrusion 412, which axially faces the rotor core 21, faces the magnet 22 embedded in the rotor core 21.

The coil spring 42 is a biasing member that biases the magnetic flux short circuit plate 41 axially to the outside. A plurality of (e.g., 18) coil springs 42 is provided in a peripheral direction of the magnetic flux short circuit plate 41. Note that "magnetic flux short circuit plate 41 axially to the outside" indicates a side to which the magnetic flux short circuit plate 41 axially moves away from the rotor core 21.

The spring housing member 43 is a holding member that holds the coil spring 42. The spring housing member 43 has, for example, a cubic shape or a rectangular parallelepiped shape. The same number (e.g., 18) of plurality of spring housing members 43 as the number of the coil springs 42 are provided in the peripheral direction of the magnetic flux short circuit plate 41. Note that the shape of the spring housing member 43 is not particularly limited to a cubic shape, a rectangular parallelepiped shape, and the like. A spring hole 431 is formed on a surface facing the magnetic flux short circuit plate 41 in the axial direction of the spring housing member 43. The spring hole 431 houses a part of the coil spring 42. Note that, a depth direction of a spring hole 431 corresponds to the axial direction of the shaft 10. One end of the coil spring 42 in the axial direction is in contact with a surface of the magnetic flux short circuit plate 41, which faces the spring housing member 43 in the axial direction of the annular portion 411. Furthermore, the other end of the coil spring 42 in the axial direction is in contact with a bottom surface of the spring hole 431. Note that an outer peripheral surface of the spring housing member 43 radially faces an inner peripheral surface of the protrusion 412 of the magnetic flux short circuit plate 41. For example, the inner peripheral surface of the protrusion 412 can slide by using the outer peripheral surface of the spring housing member 43 as a guide surface, and the magnetic flux short circuit plate 41 can axially move. Furthermore, contact of the inner peripheral surface of the protrusion 412 with the outer peripheral surface of the spring housing member 43 can regulate radial movement of the magnetic flux short circuit plate 41.

The shaft fastening member 44 is a fixing member that fixes the spring housing member 43 to the shaft 10. The shaft fastening member 44 has an annular shape, and is fixed by the inner peripheral side of the shaft fastening member 44 being fastened to the shaft 10. A plurality of spring housing members 43 is integrally provided in the peripheral direction on the outer peripheral side of the shaft fastening member 44. This fixes the spring housing member 43 to the shaft 10 via the shaft fastening member 44.

Figure 2:
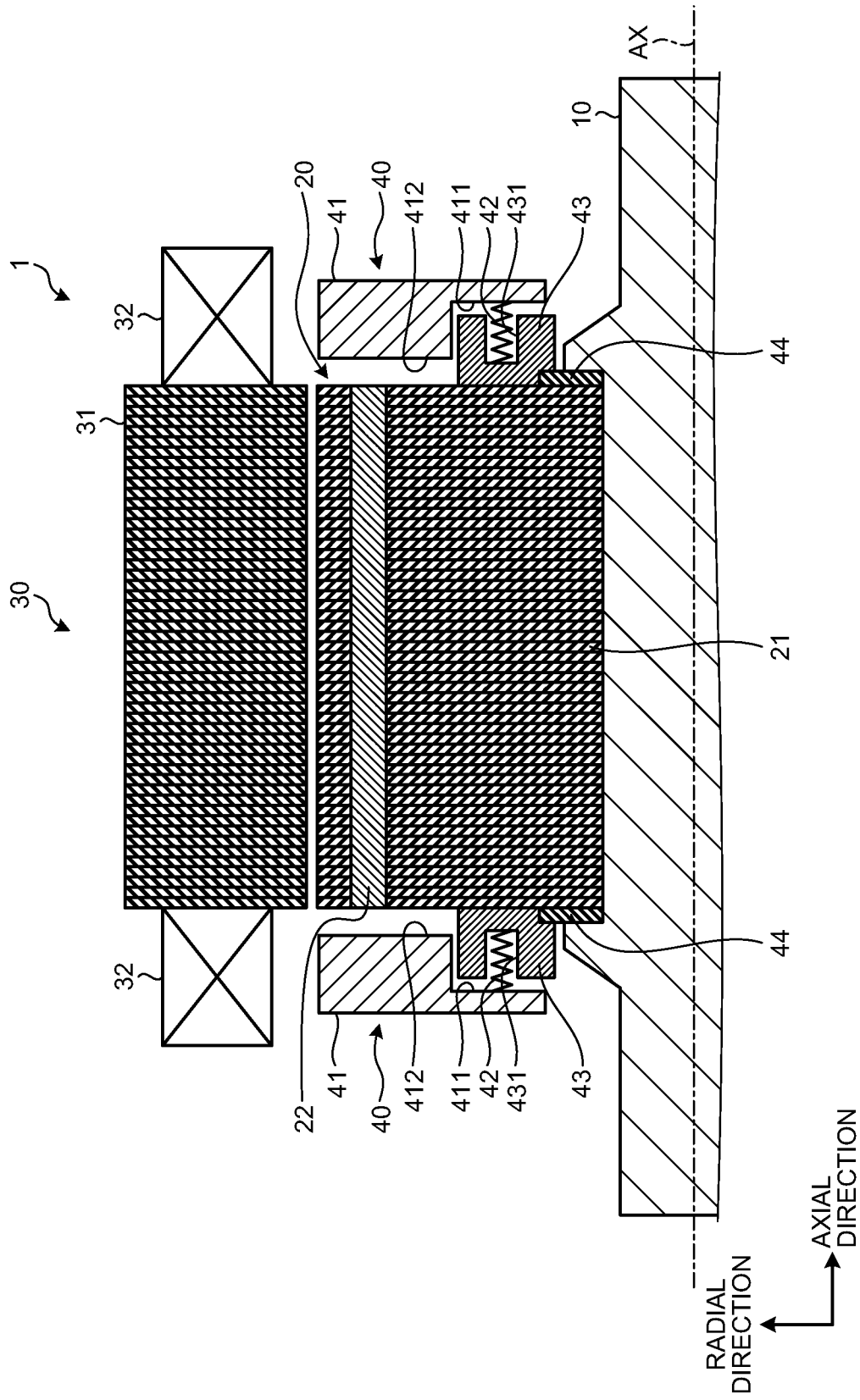
FIG. 2 is a side view illustrating the configuration of the rotary electric machine according to the embodiment, and illustrates the magnetic flux short circuit plate located at a second position.

The magnetic flux short circuit plate 41 in FIG. 1 is located at a first position. The "first position" is a position where the magnetic flux short circuit plate 41 is axially moved most away from the rotor core 21 by biasing force of the coil spring 42. Furthermore, the magnetic flux short circuit plate 41 in FIG. 2 is located at a second position. The "second position" is a position where the magnetic flux short circuit plate 41 axially comes closest to the rotor core 21 against the biasing force of the coil spring 42. In the rotary electric machine 1 according to the embodiment, the magnetic flux short circuit plate 41 axially moves between the first position and the second position, so that an amount of a short circuit of a part of a magnetic flux generated from the magnet 22 embedded in the rotor core 21 to the protrusion 412 of the magnetic flux short circuit plate 41 (amount of leakage magnetic flux) can be changed. That is, in the rotary electric machine 1 according to the embodiment, as the magnetic flux short circuit plate 41 axially come closer from the first position to the second position, a leakage magnetic flux amount of a short circuit of a part of a magnetic flux generated from the magnet 22 to the protrusion 412 of the magnetic flux short circuit plate 41 can be increased. In such a way, the magnetic flux variable mechanism 40 changes an amount of a leakage magnetic flux that short-circuits from the magnet 22 to the protrusion 412 of the magnetic flux short circuit plate 41, and can change an amount of a magnetic flux supplied from the magnet 22 to the stator 30.

Note that, in order to move the magnetic flux short circuit plate 41 from the first position to the second position, for example, the magnitude of current flowing through the stator coil 32 is made larger than a predetermined value, and an amount of a leakage magnetic flux that short-circuits from the magnet 22 to the protrusion 412 of the magnetic flux short circuit plate 41 located at the first position is increased. Then, force of axially attracting the magnetic flux short circuit plate 41 to a side approaching the rotor core 21 and moving the magnetic flux short circuit plate 41 to the second position is generated.

Furthermore, in the rotary electric machine 1 according to the embodiment, it is also possible to adopt configuration in which the magnetic flux short circuit plate 41 is moved from the first position to the second position by applying, to the magnetic flux short circuit plate 41, force of moving the magnetic flux short circuit plate 41 from the first position to the second position against the biasing force of the coil spring 42 by using an actuating mechanism including an actuator and the like. In this case, the first position can be defined as a non-short-circuit position at which a leakage magnetic flux does not short-circuit from the magnet 22 to the protrusion 412 of the magnetic flux short circuit plate 41. The second position can be defined as a short-circuit position at which the leakage magnetic flux short-circuits from the magnet 22 to the protrusion 412 of the magnetic flux short circuit plate 41.

In the rotary electric machine 1 according to the embodiment, for example, the magnetic flux short circuit plate 41 is moved from the first position to the second position at the time of high-speed rotation, and an amount of a leakage magnetic flux that short-circuits from the magnet 22 to the protrusion 412 of the magnetic flux short circuit plate 41 is increased. An amount of a magnetic flux supplied from the magnet 22 to the stator 30 is thereby reduced, and counter electromotive voltage at the time of high-speed rotation is inhibited.

Here, in the rotary electric machine 1 according to the embodiment, the spring housing member 43 and the shaft fastening member 44 of the magnetic flux variable mechanism 40 are made of different materials. The shaft fastening member 44 has a material with strength higher than that of a material of the spring housing member 43. Specifically, in the rotary electric machine 1 according to the embodiment, the shaft fastening member 44 includes metal, and the spring housing member 43 includes resin. Examples of the metal used for the shaft fastening member 44 include non-magnetic stainless steel. Furthermore, examples of the resin used for the spring housing member 43 include polyphenylene sulfide (PPS) resin.

As described above, in the rotary electric machine 1 according to the embodiment, the spring housing member 43 includes a material with strength lower than that of a material of the shaft fastening member 44 while the strength of the shaft fastening member 44, to which a high load is applied at the time of rotation of the shaft 10, is secured. In the rotary electric machine 1 according to the embodiment, machining the spring housing member 43 such as forming the spring hole 431 is easier than in a case where the spring housing member 43 includes a material with strength equal to or more than the strength of the shaft fastening member 44, an increase in machining costs is inhibited, and eventually, an increase in cost of the rotary electric machine can be inhibited.

Furthermore, in the rotary electric machine 1 according to the embodiment, the shaft fastening member 44 includes metal while the spring housing member 43 includes resin. The spring housing member 43 can be molded with the spring hole 431 formed by a mold and the like. Thus, the cost can be reduced as compared to a case where the spring hole 431 is formed by machining later.

Further effects and variations can be easily derived by those skilled in the art. Thus, the broader aspect of the present disclosure is not limited to the specific details and the representative embodiment represented and written above. For example, although, in the present embodiment, a case where the magnetic flux variable mechanisms 40 are provided on both sides of the rotor 20 in the axial direction has been described, this is not a limitation. The magnetic flux variable mechanism 40 is only required to be provided on at least one side of the rotor 20 in the axial direction. Therefore, various changes can be made without departing from the spirit or scope of the general inventive concept defined by the appended claims and equivalents thereof.

The rotary electric machine according to the present disclosure has an effect of inhibiting an increase in cost.

According to an embodiment, in a rotary electric machine, machine a holding member is easier than in a case where the holding member includes a material with strength equal to or more than the strength of a fixing member, an increase in machining costs is inhibited, and eventually, an increase in cost of the rotary electric machine is inhibited.

According to an embodiment, machining the holding member is facilitated since the holding member is made of resin. The strength of the fixing member remains secured by metal. This can reduce the machining costs.

According to an embodiment, the holding member can be molded with a spring hole formed by a mold and the like, which can reduce costs as compared to a case where the spring hole is formed by machining later.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rotary electric machine comprising:
  a shaft that rotates about an axial direction;
  a rotor that is disposed around the shaft and that includes a rotor core and a plurality of magnets provided in the rotor core;
  a stator that is disposed around the rotor and that includes a stator core and a stator coil provided in the stator core;
  a magnetic flux short circuit plate that is disposed so as to face the rotor core in the axial direction and that moves in the axial direction;
  a biasing member that biases the magnetic flux short circuit plate to a side away from the rotor core in the axial direction;
  a holding member that holds the biasing member; and
  a fixing member that fixes the holding member to the shaft,
  wherein a strength of a material of the fixing member is higher than a strength of a material of the holding member.

2. The rotary electric machine according to claim 1,
  wherein the material of the fixing member is a metal, and
  a material of the holding member is a resin.

3. The rotary electric machine according to claim 2,
  wherein the biasing member is a coil spring, and
  the holding member includes a spring hole that houses a part of the coil spring.

\* \* \* \* \*